United States Patent [19]

Ptashinski

[11] Patent Number: 4,915,055
[45] Date of Patent: Apr. 10, 1990

[54] CONDUIT LOCATOR

[76] Inventor: Edmund J. Ptashinski, Rt. 1, Box 184-F, Banks, Oreg. 97106

[21] Appl. No.: 278,770

[22] Filed: Dec. 2, 1988

[51] Int. Cl.$^4$ .............................................. F16L 55/00
[52] U.S. Cl. ........................... 116/209; 116/DIG. 14; 52/105; 138/104; 138/105; 405/157; 428/85; 428/192; 220/3.3; 220/3.4
[58] Field of Search ............... 116/200, 209, DIG. 14; 52/103, 105; 138/104, 105; 174/37; 405/157; 220/3.3, 3.4, 3.7, 3.9; 248/70, 542, 679; 404/3, 10, 43; 428/85, 192

[56] References Cited

U.S. PATENT DOCUMENTS

| | | | |
|---|---|---|---|
| 966,086 | 8/1910 | Faile | 52/221 |
| 1,825,049 | 9/1931 | Chamberlain et al. | 52/105 |
| 3,015,408 | 1/1962 | Campbell et al. | 220/3.4 |
| 3,267,901 | 8/1966 | Carroll | 116/209 |
| 3,282,057 | 11/1966 | Prosser | 405/157 |
| 3,303,264 | 2/1967 | Saul et al. | 174/48 |
| 3,568,626 | 3/1971 | Southworth, Jr. | 116/209 |
| 3,633,533 | 1/1972 | Allen et al. | 116/200 |
| 3,903,835 | 9/1975 | Carroll | 116/200 |
| 4,699,838 | 10/1987 | Gilbert | 428/201 |

Primary Examiner—William A. Cuchlinski, Jr.
Assistant Examiner—W. Morris Worth
Attorney, Agent, or Firm—Richard L. Miller

[57] ABSTRACT

This conduit locator is designed to indicate the location of an end of a conduit after concrete is poured over the conduit. Primarily, it consists of an adhesive tape having a multiple number of spaced rods adhered so as to extend from an edge of the tape, and the tape is adhered to the open end of the conduit which may be plugged or covered with out interfering with the rods extending upward. The rods are of a springy plastic and protrude upward after the concrete is poured over the conduit enabling the end of the conduit to be located beneath the surface of the concrete.

3 Claims, 1 Drawing Sheet

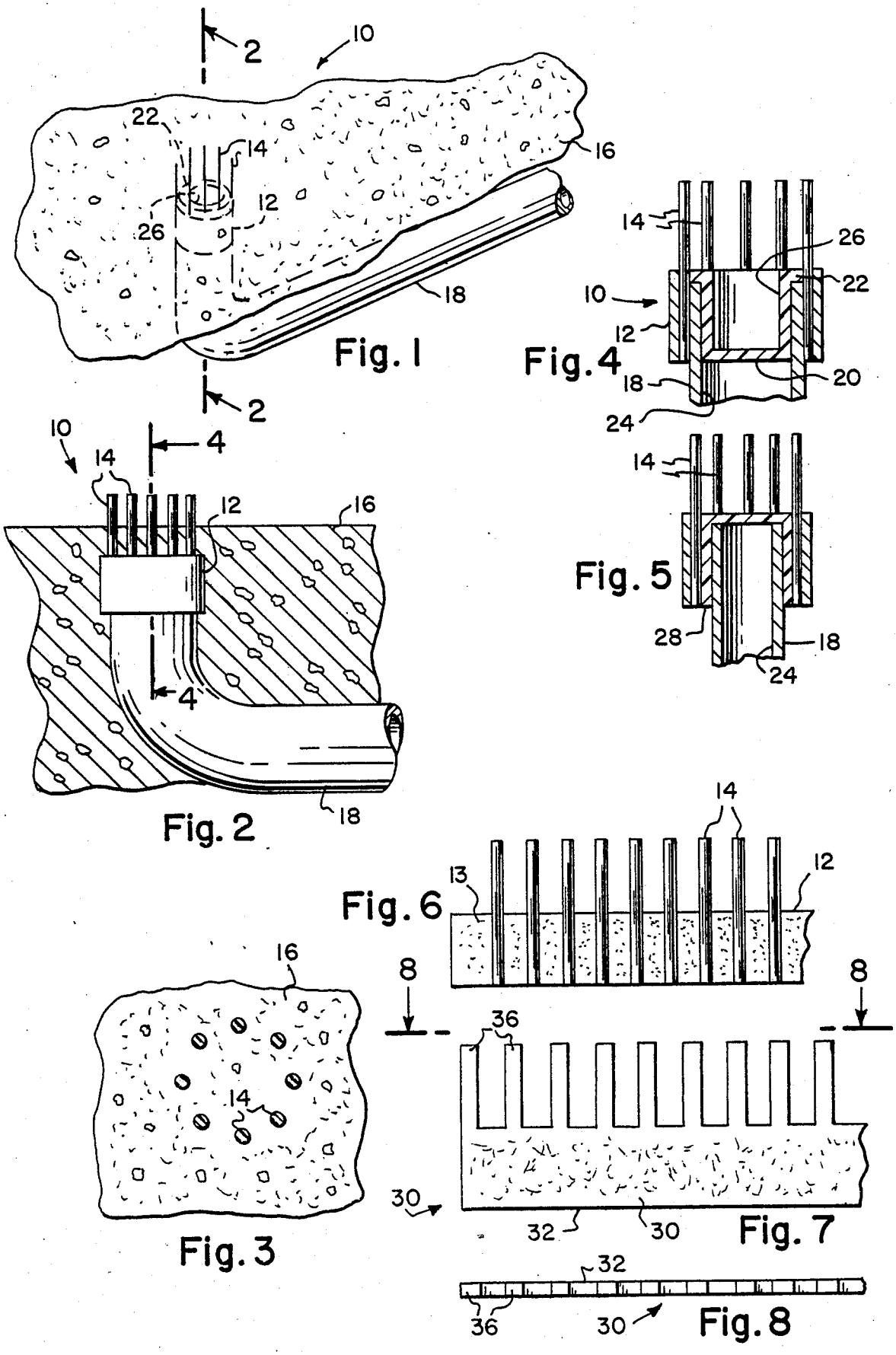

CONDUIT LOCATOR

BACKGROUND OF THE INVENTION

The instant invention relates generally to underground location devices, and more particularly, to a conduit locator.

Numerous locator devices have been provided in the prior art that are adapted to locate buried lines, utilities and cables, etcetera. For example, U.S. Pat. Nos. 3,633,533, of Allen, U.S. Pat. No. 3,568,626 of Southworth, and U.S. Pat. No. 3,282,057 of Prosser, all are illustrative of such prior art. While these units may be suitable for the particular purpose to which they address, they would not be as suitable for the purpose of the present invention as hereafter described.

SUMMARY OF THE INVENTION

A primary object of the present invention is to provide a conduit locator that will overcome the shortcomings of the prior art devices.

Another object is to provide a conduit locator that will be of such design, as to provide a visual location of a conduit beneath concrete or the like.

An additional object is to provide a conduit locator that will include a plurality of plastic rods that will protrude from the surface of concrete poured over the conduit.

A further object is to provide a conduit locator that is simple and easy to use.

A still further object is to provide a conduit locator that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows:

FIG. 1 is a perspective view of the instant invention illustrated in use buried in concrete;

FIG. 2 is an enlarged cross sectional view taken along line 2—2 in FIG. 1;

FIG. 3 is a top plan view of FIG. 1 showing the rods sheared off;

FIG. 4 is a cross sectional view taken along the line 4—4 of FIG. 2;

FIG. 5 is a view similar to FIG. 4, illustrating the invention in use on a conduit with another type of protective cap;

FIG. 6 is a fragmentary side elevational view of the instant invention shown prior to installation;

FIG. 7 is a view similar to FIG. 6 but showing another embodiment of the invention; and FIG. 8 is a view taken along line 8—8 in FIG. 7.

DETAILED DESCRIPTION OF THE PREFERRED EMBODIMENTS

Turning now descriptively to the drawings, in which like reference characters denote like elements throughout the several views, a conduit locator 10 is shown to include a length of tape 12 with an adhesive 13 on one side thereof. A plurality of equally spaced springy plastic rods 14 are adhered to the adhesive side of the tape 12 and project outward from a longitudinal edge thereof, for springing upward from the surface of concrete 16 after the concrete 16 has been poured over the conduit 18.

The rods 14 serve to locate the buried end of the conduit 18 and are later sheared off flush with the concrete 16 when a conventional plug 20 with a flange 22 is removed from the opening 24 of the conduit. The plug flange 22 provides for seating the plug 20 on the end of the conduit 18, and prevents concrete 16 from entering the opening 24 of the conduit 18 when poured, and it shall be noted that tape 12 may be made in strip or roll form.

In use, tape 12 is wound around the outer periphery of the open end of the conduit 18 with the adhesive 13 providing for the securement thereto. The edge of the tape 12 should be flush with the flanged end of the plug 20 inserted in the conduit, resulting in the rods 14 extending upward. When the concrete 16 is poured, the inherent springiness of the rods 14, causes same to elevate upward through the surface of the concrete 16 and provide visual indication of the location of the end of the buried conduit 18. After the above, the plug 20 may be located and carefully removed. Then conduit may be wired in the usual manner after shearing off the exposed rods 14.

Referring now particularly to FIG. 5 of the drawing illustrates locator 10 that can be pre-adhered to a conventional protective cover 28 which is non-flanged and placed onto the open end of the conduit 18.

In use, the locator 10 functions in the same manner heretofore described to the outer periphery of the conventional protective cover 28 that is received on the outer periphery of the conduit 18.

It shall also be recognized that in utilizing locator 10 shown in FIGS. 1, 2, and 3, the adhesive 13 of the tape 12 is employed to adhere the tape 12 to both the outer periphery of the conduit 18 and the outer periphery of the flange 22 of the conventional plug 20.

Looking now at FIGS. 7 and 8 of the drawing, a second embodiment of locator 30 is of a comb-like configuration and includes a tape 32 with an adhesive 34 on one side for adhering to a conduit 18. Tape 32 is typically fabricated of plastic material that is inherently springy, and a plurality of equally spaced teeth 36 extend and are integrally attached to one longitudinal side edge thereof.

The teeth 36 serve to function in the same manner as do the rods 14 heretofore described in the foregoing embodiments.

In use, the second embodiment of locator 30 is applied with the adhesive 34 side to the outer periphery of a conduit 18 with the teeth extending upward. When the concrete 16 is poured the teeth 36 will spring upward above the surface of the concrete 16 for location of the conduit. The teeth 36 are also sheared off after completion of such a project, as was previously mentioned.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A conduit locator which comprises:
   (a) an adhesive tape adhesively attachable to an end of a plugged conduit prior to covering said conduit with concrete and other material; and
   (b) a plurality of springy rods secured to said tape so as to protrude upwardly through a top surface of said concrete and other material after said concrete and other material is poured, thereby serving to indicate the location of said end of said conduit beneath said top surface.

2. A conduit locator as set forth in claim 1, wherein said plurality of springy rods are equally spaced apart and are fixedly secured in said adhesive which is adhered to one side of said tape such that ends of said rods project from one longitudinal side edge of said tape, whereby the ends of said rods may spring upward through said top surface of said concrete and other material after said concrete and other material is poured, enabling said conduit to be located beneath the surface of said concrete and other material.

3. A conduit locator as set forth in claim 1, wherein said plurality of springy rods are equally spaced apart and are integrally a part of and attached to one side of said tape, and ends of said rods project from one longitudinal side edge of said tape, whereby the ends of said rods may spring upward through said top surface of said concrete and other material after said concrete and other material is poured, enabling said conduit to be located beneath the surface of said concrete and other material.

* * * * *